United States Patent
Partington et al.

(10) Patent No.: US 8,495,913 B2
(45) Date of Patent: Jul. 30, 2013

(54) LEVEL MEASUREMENT SYSTEM

(75) Inventors: Thomas John Partington, Leeds (GB); Paul David Featonby, Newcastle (GB); Kenneth James, Yarm (GB); Peter Jackson, Stockton-on-Tees (GB)

(73) Assignee: Johnson Matthey PLC, London (GB)

( * ) Notice: Subject to any disclaimer, the term of this patent is extended or adjusted under 35 U.S.C. 154(b) by 220 days.

(21) Appl. No.: 12/742,851

(22) PCT Filed: Nov. 13, 2008

(86) PCT No.: PCT/GB2008/003812
§ 371 (c)(1),
(2), (4) Date: May 13, 2010

(87) PCT Pub. No.: WO2009/063194
PCT Pub. Date: May 22, 2009

(65) Prior Publication Data
US 2010/0257931 A1    Oct. 14, 2010

(30) Foreign Application Priority Data
Nov. 13, 2007   (GB) .................................. 0722256.5

(51) Int. Cl.
*G01F 23/28*    (2006.01)
*G01N 13/00*    (2006.01)

(52) U.S. Cl.
USPC ........................................ 73/290 V; 73/64.55

(58) Field of Classification Search
USPC ........... 73/290 V, 1.82, 1.86, 861.25–861.29, 73/64.55; 340/621
See application file for complete search history.

(56) References Cited

U.S. PATENT DOCUMENTS

| | | | |
|---|---|---|---|
| 4,535,628 A | 8/1985 | Hope | |
| 4,565,088 A | 1/1986 | Crambes | |
| 4,660,419 A * | 4/1987 | Derkacs et al. | 73/622 |
| 5,557,584 A * | 9/1996 | Suchman | 367/131 |
| 5,983,723 A * | 11/1999 | Buckin et al. | 73/633 |
| 2003/0117150 A1 | 6/2003 | Noik et al. | |
| 2004/0182414 A1* | 9/2004 | Puskas | 134/1 |
| 2005/0092058 A1* | 5/2005 | Ellson et al. | 73/1.82 |
| 2006/0266382 A1* | 11/2006 | Matsubara | 134/33 |
| 2007/0017094 A1* | 1/2007 | Takizawa et al. | 29/882 |
| 2007/0209434 A1* | 9/2007 | Peters | 73/290 V |
| 2007/0261501 A1* | 11/2007 | Lang | 73/861.27 |

FOREIGN PATENT DOCUMENTS

| | | | |
|---|---|---|---|
| FR | 2 853 416 A1 | 10/2004 | |
| GB | 1 524 303 | 9/1978 | |
| GB | 2401436 A * | 11/2004 | |
| WO | WO-82/04122 A1 | 11/1982 | |
| WO | WO-00/22387 A1 | 4/2000 | |
| WO | WO-03/012379 A1 | 2/2003 | |

OTHER PUBLICATIONS

Paschotta, Rudiger "Encyclopedia of Laser Physics and Technology: A-M, vol. 1", Wiley-VCH, Nov. 19, 2008—p. 521.*

* cited by examiner

*Primary Examiner* — Hezron E Williams
*Assistant Examiner* — David Z Huang
(74) *Attorney, Agent, or Firm* — RatnerPrestia (57) ABSTRACT

An apparatus and method for the identification of different phases (11-20) in a multi-phase medium includes at least two arrays (26A, 26B) of ultrasound transducers capable of transmitting and receiving ultrasound through the medium separating them. The method and apparatus is useful for the location of phase interfaces in vessels such as oil separators.

23 Claims, 3 Drawing Sheets

LEVEL MEASUREMENT SYSTEM

CROSS-REFERENCE TO RELATED APPLICATIONS

This application is the U.S. National Phase application of PCT International Application No. PCT/GB2008/003812, filed Nov. 13, 2008, and claims priority of British Patent Application No. 0722256.5, filed Nov. 13, 2007, the disclosures of both of which are incorporated here by reference in their entirety for all purposes.

FIELD OF THE INVENTION

The present invention concerns a level measurement system and apparatus and a method for detecting the location of an interface between different materials contained in a vessel, e.g. for measuring the level of a material within a vessel.

BACKGROUND OF THE INVENTION

Level measurement systems, i.e. for use in measuring the level of a material within a vessel, are well known. It is also known to locate the boundaries between different materials in a vessel by measuring the density of the vessel contents at different locations to form a density profile of the vessel and contents in order to identify density changes which are indicative of boundary regions. For example, it has been proposed in WO 00/22387 to measure the density profile of a medium by providing an axially distributed array of sources of gamma radiation to give collimated beams of said radiation and an axially distributed array of detectors disposed so that the medium under study extends between the sources and the detectors. By monitoring the radiation received by the detectors, the amount of radiation absorbed by the medium from each beam can be determined and so variations in the medium density can be detected. One disadvantage of the system of WO 00/22387 is the need to employ radioactive materials which consequently imposes health and safety issues in order to ensure safe working.

GB 1524303 describes an apparatus used to determine the boundary between liquids of different densities by means of an elongated member along the length of which a series of housings is disposed with spaces between each housing into which spaces the medium under study can enter through perforations in the wall of the elongated member. Each housing comprises an ultrasonic transmitter and detector and the end of each housing acts as a reflector to reflect waves from the transmitter of the next adjacent housing back, through the medium in the space between the housings, to that next adjacent housing. One disadvantage of this type of arrangement is that the vertical resolution is limited by the need to provide a vertical space between each of the housings.

WO03/012379 describes apparatus for monitoring the composition of a medium comprising an elongated member for insertion into said medium, said member having an array of transmitters and receivers of ultrasonic waves disposed at intervals along at least part of its length, and reflector means to reflect transmitted ultrasonic waves to the receivers, said reflector means being supported by, but laterally spaced from, said member whereby, when said elongated member is inserted into said medium, the medium occupies the space between said elongated member and said reflector means, and said transmitters, receivers and reflector means being disposed so that transmitted ultrasonic waves pass through said medium en route to the receivers, and monitoring means providing a signal dependent upon the time taken for an ultrasonic sound wave to travel from a transmitter to a receiver associated therewith.

U.S. Pat. No. 4,565,088 describes an apparatus for the detection of changes of composition in a desalting vessel in which an ultrasonic probe emits sound towards a mirror which is arranged to travel vertically within a dip tube. The mirror directs the sonic energy out of the dip tube towards a reflector positioned apart from the dip tube within the vessel so that the energy is reflected back to the mirror and up the dip tube to be received by the probe.

SUMMARY OF THE INVENTION

The present invention provides an improved method, apparatus for use in carrying out the method, and system for the determination of levels of contents within a vessel.

According to a first aspect of the invention a method of determining the location of an interface between two materials within a vessel comprises the steps of:

(a) providing a plurality of first ultrasound transducers capable of transmitting ultrasound through at least one of said materials, said first transducers being located within a first elongate housing, spaced apart from one another along a longitudinal axis of the housing;

(b) providing a plurality of second ultrasound transducers capable of receiving ultrasound transmitted by said first ultrasound transducers and generating an electrical signal in response thereto, said second transducers being located within a second elongate housing, spaced apart from one another along a longitudinal axis of the housing, (c) each one of said first ultrasound transducers being associated with a respective one of said second ultrasound transducers to form a transmitter-receiver pair, such that ultrasound emitted by one member of said pair may be received by and generate an electric signal in the other member of said pair (d) locating the first and second housings within the vessel such that the ultrasound transmitted by at least one of the first transducers is capable of being detected by at least one respective second transducer and that the first and second housings containing the transducers are at least partially immersed in at least one of the materials contained in the vessel, (e) transmitting ultrasound from more than one of said first ultrasound transducers to associated respective second ultrasound transducers and monitoring the signal generated by each of said second ultrasound transducers in response to the ultrasound transmitted by said first ultrasound transducers, (f) comparing the signal generated by each second ultrasound transducer or a parameter calculated from said signal with a corresponding signal or parameter calculated therefrom generated by an adjacent second transducer to determine whether an acoustic characteristic of the material located between the first housing and the second housing changes between the positions of adjacent second transducers.

According to a second aspect of the invention an apparatus for determining the location of an interface between two materials within a vessel comprises:

(a) a plurality of first ultrasound transducers capable of transmitting ultrasound through at least one of said materials, said first transducers being located within a first elongate housing, spaced apart from one another along a longitudinal axis of the housing;

(b) a plurality of second ultrasound transducers capable of receiving ultrasound transmitted by said first ultrasound transducers and generating an electrical signal in response thereto, said second transducers being located within a second elongate housing, spaced apart from one another along a longitudinal axis of the housing, (c) each one of said first ultrasound transducers being associated with a respective one of said second ultrasound transducers to form a transmitter-receiver pair, such that ultrasound emitted by one member of said pair may be received by and generate an electric signal in the other member of said pair (d) mounting means for said first and second housings, said mounting means being capable of maintaining said first and second housings in a position relative to each other such that each one of a transmitter-receiver pair is aligned with the other one of the transmitter-receiver pair and that ultrasound transmitted by at least one of the first transducers is capable of being detected by at least one respective second transducer, (e) mounting means for mounting the first and second housings within a vessel such that at least a part of the first and second housings containing the transducers may be immersed in at least one of the materials contained in the vessel (f) signal and data processing means capable of comparing signals generated by, the second ultrasound transducers or a parameter calculated from said signals to determine whether an acoustic characteristic of any material located between the first housing and the second housing changes between any of the transmitter-receiver pairs.

BRIEF DESCRIPTION OF THE DRAWINGS

The invention will be described in detail in the following example with reference to the accompanying drawings, which are.

DETAILED DESCRIPTION OF THE INVENTION

Preferably the plurality of first and second transducers are each arranged in a linear array.

"Receive", "receiver" etc as used in relation to the receipt of sound by a transducer in this, specification should be taken to include the meaning of "detect" and "detector". The ultrasound transducers preferably comprise piezoelectric materials. A piezoelectric material is capable of generating and transmitting sonic vibrations in response to an appropriate voltage or change in voltage and it can also generate an electrical signal when stimulated by an appropriate sonic vibration. Suitable piezoelectric materials include piezoelectric polymers and crystals. The first and second transducers may be and preferably are of similar type. The first and second transducers preferably comprise piezoelectric crystals. The frequency of the ultrasonic waves may be selected according to the material through which the radiation is expected to pass. For measurement of a level within a liquid system, the preferred range of frequencies used is from 20 kHz to 25 MHz. A gas phase material may require lower frequency emissions, e.g. 1-100 kHz, whereas for measurement in a liquid system the frequency used may be optimized at 2 to 10 MHz, more preferably 1-5 MHz. The transducers may be selected to emit at the same frequency as each other or one or more of them may emit sound at a different frequency from the other transducers. One of more of the transducers may be capable of emitting/transmitting and receiving a range of different frequencies. At least one transmitter-receiver transducer pair may be adapted to emit and receive sound at a plurality of different frequencies. The transducers may be periodically stimulated to emit waves of a frequency suitable to induce cavitation of the fluid at the surface of the transducer and housing, in order to clean the surface of the transducer and adjacent housing and avoid build-up of dirt and mineral scales. The practical upper limit of frequencies used for such cleaning is about 10 MHz. The transducers may also be selected to transmit and/or detect vibration outside of the ultrasonic spectrum, e.g. frequencies in the audible range and down to 1 Hz. As a further alternative, the frequency at which each transducer is adapted to transmit and receive may be different at different locations on the apparatus. For example, when the apparatus is intended for use in phase identification in an oil separation vessel, the transducers at the end of the housing or dip tube located in the upper portion of the vessel may be tuned to transmit sound at a frequency selected for transmission through a gas phase, whilst transducers located a greater distance from the upper portion may be tuned to frequencies adapted to be transmitted through a liquid phase. As a further alternative at least one additional array of transducers may be provided which are capable of transmitting and receiving sound having different characteristics from that transmitted and received by the first and second plurality of transducers. The additional array(s) may be present within the same housing as the first and/or second plurality of transducers. Alternatively such additional arrays may be provided (each) in a separate housing.

The number of ultrasound transducers provided depends upon the size of the vessel, the depth of material and the resolution required. The resolution achievable, i.e. the distance over which a change in acoustic properties and thus an interface may be detected, is governed by the distance between the pairs of transducers along the housing, which is determined, in part, by the size of the transducers used. Using readily available transducers, the minimum spacing is about 10 mm, centre to centre. When the transducers are very close together, it is desirable to provide a coded signal or time-gated activation and detection in order to avoid cross-talk, i.e. transmission and receipt of the ultrasound between different pairs of transducers. For an apparatus suitable for use in an industrial oil separator of the type used in the oil and gas recovery industry, the number of pairs of transducers varies typically from 2 to 500, but may be greater. The spacing between adjacent pairs of transducers may vary along the length of the housings but is more usually constant.

The first and second transducers are preferably mounted within respective first and second housings. The housings may be of circular or other cross section. In one embodiment, the housing cross section is designed to provide a surface normal to the direction of transmission of the ultrasound in order to minimize scatter of reflected waves. Therefore housings may have one or more planar walls e.g. to provide a box-section or other polygonal shape. The housings need not be of regular cross section. For example they may be generally circular but have a planar wall opposite the transducers. The housings are preferably arranged substantially parallel to one another, preferably spaced apart, preferably by a distance of 10-300 mm. The apparatus of the invention includes mounting means, such as supports or brackets for example, which are capable of maintaining the first and second housings in the desired arrangement relative to each other. The housings are preferably formed from a material which is strong and resistant to the environment in which measurements are to be made but which is also relatively transparent to ultrasound. Metals of low density are preferred. For use in oil separators and storage facilities, the housings are preferably formed of titanium or a titanium alloy which is resistant to corrosion and is significantly less attenuating to ultrasound than steel. In a preferred embodiment, the apparatus comprises at least two titanium dip tubes, held parallel and spaced apart by 10-300 mm by a mounting means, each dip tube containing from 2-500 ultrasonic transducers arranged generally linearly along the length of the dip tube. The housings may be continuous with the wall of a vessel or fixed to the vessel in such a way that the interior of the vessel may be maintained at elevated pressure and temperature outside the housings. The housings form a protective barrier between the transducers and the contents of a vessel in which they are placed. Each transducer is preferably mounted in close contact with the internal wall of the housing. This may be achieved by mounting the transducers in one or more solid supporting blocks, arranged within the housing to place the transducer adjacent to the internal wall of the housing. Alternatively the transducers may be mounted using a biasing means to hold the transducer in place against the housing wall.

The housings also contain the required electrical connections between each transducer, a source of power and signal processing means for analyzing the response of the second, "detector" transducers to received ultrasound. The housings preferably also contain a coupling fluid selected to minimize loss of ultrasonic energy as it passes through the internal space and wall of the housing and adjacent medium. In the absence of a coupling fluid, ultrasonic energy is lost as the sound waves pass through air, which is highly attenuating to ultrasound. When the level measurement apparatus is intended for use in an environment having an explosion hazard, the presence of a coupling fluid may also serve to reduce the risk of explosion because it excludes oxygen from the vicinity of the electrical connections. The coupling fluid may be selected to be appropriate for the level measurement application. For use in oil separators, an electrically insulating, high temperature-resistant coupling fluid, such as a silicone oil, is preferred. In some embodiments the dip tubes are coated on their internal and/or their external surfaces with a coating selected to provide acoustic coupling between the dip tube material and the medium with which it is in contact. The coupling coatings generally minimize the density change at the interface between the metal dip tube and the fluid medium which could otherwise dissipate a portion of the ultrasonic energy.

The apparatus further comprises a source of power and a pulse generator to drive the first transducers to emit ultrasound of the required frequency. The pulse generator may provide regular pulses or irregular, coded pulses which may be of different intervals and amplitude (voltage) for each transducer or for a group of transducers. By electrically grouping the pairs of transducers into m longitudinally spaced apart sets, e.g. with each mth transducer being part of the same set, it is possible to stagger the transmission of ultrasound between adjacent transducers, further reducing the risk of any transducer detecting ultrasound from another pair of transducers. The use of coded signals may also be desirable for situations where there is a very low signal to noise ratio in order that signals can be extracted from within the noise band. A switching circuit is preferably used to sequence the pulses sent to the transmitting transducers and also optionally to provide time-gated detection of the sequenced pulses by the detecting transducers.

The signal processing means receives the electronic signals from the detector transducers by means of a conventional wired connection, a fibre-optic link or by means of wireless transmission. The signal processing means and/or an associated data processing means is capable of comparing signals generated by the second ultrasound transducers or a parameter calculated from said signals to determine whether the acoustic characteristics of any material located between the first housing and the second housing changes between any adjacent second transducers. The power source, pulse generator, switching circuits and signal processing means are preferably located within a separate "control" housing which may be connected to the housings containing the ultrasonic transducers. The control housing may comprise mounting means by which the transducer housings may be mounted on the control housing to form a contiguous level measurement instrument. Data may be communicated to a user by means of a visual display or an audible or visual alarm to alert the user of a particular change in level during operation of the method. Alternatively, information from the level measurement apparatus may be used directly in a control system to control the level of material which has been measured. Information from the signal processing means may be transmitted to a remote location for use by a user or in a control system. For example, when the level measurement apparatus is used in a sub-sea oil separator vessel, the signals from the transducers may be processed locally by the signal processing means and then transmitted to a control system, data processor or operator located remotely on the surface.

The apparatus may further comprise one or more temperature sensors to measure the temperature of the material between the first and second transducers. Temperature measurement may be achieved using one or more sensors placed on or within the transducer housings or within a separate housing spaced apart from the transducer housings. Alternatively a temperature probe may extend from one or more of the housings. The temperature probe, if present, is electrically connected to the data processing means so that information concerning the temperature may be used in calculating a property of the material, e.g. density or composition, from the ultrasonic transmission data.

In operation it is preferred that ultrasound emitted by a first transducer is detected by a second transducer and the signal from the second transducer is used to calculate the time of flight and/or the attenuation of the energy through the material between the first and second transducers. This arrangement differs in principle from that described in WO03/012379 in which a single linear array of ultrasound transducers was provided spaced apart from a reflector which reflected the emitted ultrasound back to the emitting transducer.

Normally the first and second transducers are capable of both transmitting and receiving sound. References in this specification to the first transducers being emitters and the second transducers being receivers of sound are not intended to exclude methods and apparatus in which first transducers detect sound emitted by second transducers. In a preferred method according to the invention, both the first and second transducers emit and receive ultrasound. In one embodiment, a first transducer emits ultrasound towards a respective second transducer, which, upon receipt of the pulse is stimulated to transmit back to the initiating first transducer. Such operation, whereby receipt of ultrasound triggers a subsequent transmission is referred to as "sing-around". Where both first and second transducers emit and detect ultrasound they may be referred to as a first/second transducer pair, rather than as transmitter and receiver: One benefit of operating in this way is the inherent self-checking offered. For example, if a signal is not detected from a receiving transducer in response to a transmission of ultrasound, it may be due to excessive scattering of the sound waves by a highly dispersed medium (e.g. sand particles in water or a foam or emulsion) or by a faulty transducer. However, in sing-around operation, the other of a pair of transducers may provide a signal which would indicate that the medium between the transducers is not the cause of a lack of signal. The sing-around mode of operation may be extended to three or more transducers, if required.

Information about the material through which the ultrasound passes from a transmitting transducer to a receiving transducer may be obtained from the "time of flight" (TOF) of the ultrasound, i.e. the time between emission of the ultrasound from a transmitting transducer and receipt of the ultrasound by a receiving transducer. In a fluid, the speed of sound, $c=\sqrt{K/\rho}$, where K is the bulk modulus of elasticity of the fluid and $\rho$ (rho) represents the density. The pressure of a fluid, especially a gas, affects its density, as does the composition of a liquid. The speed of sound in seawater, for example, is dependent upon the salinity of the seawater. Therefore the time between emission and receipt of the ultrasound varies according to the density of the material through which the sound is transmitted and the density may be calculated from the TOF data, provided the temperature and pressure is known. In practice the apparatus and method is most useful for detecting the presence and location of boundaries between materials in a vessel, i.e. for detecting regions of different density or composition along the length of the housings. This application does not require a calculation of absolute density to be made: it is sufficient that the time of flight between different transmitter-receiver pairs is measured with sufficient precision that a difference is detectable between transmission through one material, e.g. oil, and another material, e.g. water. The difference between the TOF of ultrasound through two materials such as oil and water usually varies with temperature. At higher temperatures the differences are usually greater. For example, the velocity of sound through water increases from about 1427 m/s at 5° C. to about 1555 m/s at 70° C. The speed of sound through crude oil decreases over this temperature range from about 1400 m/s to about 1150 m/s depending on the composition of the oil.

Alternatively, or in addition to, TOF measurement, the attenuation of the ultrasound on transmission through the material between the transmitter and receiver may be measured. Sound waves are deflected at phase boundaries and show significant attenuation when transmitted through discontinuous materials such as emulsions, foams and suspensions. The attenuation is detectable by monitoring the voltage across the detecting transducer. By determining the attenuation it is possible to estimate, for example, the amount of sand suspended within the fluid phases of the contents of an oil separator vessel. In a preferred embodiment both the attenuation and time of flight of the ultrasonic waves are calculated from the response of the receiving transducer.

In a particular embodiment of the method of the invention, the detection by one or more of the transducers of its own emissions reflected back from the internal wall of the housing may be monitored. The detection of internally reflected ultrasound may be facilitated by time-gated detection methods or the use of coded pulses. A pulse of ultrasound generated for internal reflection analysis may be of lower amplitude than a pulse generated for transmission to another transducer. The amount of energy reflected from the internal wall of the housing may provide information about the acoustic coupling between the external wall of the housing and the material external and immediately adjacent to it. When the coupling is good, ultrasonic energy can penetrate through the wall into the surrounding medium. When the coupling is less good, less energy is transmitted through the wall so that more energy is reflected back to the transducer within the housing. A change in coupling may indicate a build-up of scale or other deposits on the housing, or a change in the bulk material in contact with the housing adjacent the transducer, e.g. a foam-metal interface has different acoustic coupling characteristics from a liquid-metal interface.

In another embodiment, the apparatus comprises at least one further ultrasound transducer mounted such that it transmits ultrasound essentially perpendicular to an upper surface of material contained in the vessel. Normally this further transducer is mounted within its own housing and is oriented to transmit ultrasound in the direction of the longitudinal axis of the first and second transducer housings. The further transducer is intended to indicate the position of the upper level of a condensed-phase material within the vessel. In an oil separator, the upper level may comprise a foam, which may be difficult to distinguish from a gas by density difference or time of flight of the ultrasound because the foam may be too attenuating to ultrasound to generate a reliable signal. The use of a further transducer simply to emit ultrasound towards the top layer and receive reflections from the surface of the top layer provides an additional means of locating the level of such a surface. The characteristics of the reflected ultrasound may also provide information as to the nature of the surface, e.g. roughness or movement. The further ultrasound transducer may be located at the top of a vessel to locate the top surface or at the bottom of a vessel to locate a lower interface. In an oil separator, the bottom layer often contains sand and is relatively dense. In such a position attenuation of the ultrasound in such a phase may be relatively high making reflection measurements difficult. The further ultrasound transducer may be attached to or integral with other parts of the apparatus or it may be separate from those other parts. It is preferred that, even when the apparatus is separate from the further transducer, the signal from the further transducer is receivable by and processable by the data and signal processing means provided with the apparatus of the invention.

Accordingly the present invention provides apparatus for monitoring the composition of a multi-phase medium comprising two or more elongate housings for insertion into said medium, each said housing having an array of transmitters and receivers of ultrasonic waves disposed at intervals along at least part of its length, whereby, when said housings are inserted into said medium, the medium occupies the space between said elongate housings and said transmitters and receivers are disposed so that transmitted ultrasonic waves pass through said medium en route to the receivers, and monitoring means providing a signal dependent upon the time taken for an ultrasonic sound wave to travel from a transmitter to a receiver associated therewith.

The ultrasonic waves are preferably transmitted as pulses and the time taken between transmission and receipt of a pulse is monitored. This time, the "time of flight", is thus indicative of the total time taken for the ultrasonic wave to travel from the transmitter, through the medium to the receiver, and hence is dependent on the velocity of the wave through the medium. By calibration by measuring the times with different materials, such as oil, water and air, as the medium, the monitored time can be used as a indication of the nature of the medium at the location of the transmitter and receiver. By measuring the times at transmitter/receiver pairs at different spatial locations along the length of the elongate members, the location of interfaces or boundaries between different materials of said medium can be determined. Many applications do not require a calculation of absolute density to be made: it is sufficient that the time of flight between different, especially adjacent, transmitter-receiver pairs is measured with sufficient precision that a difference is detectable between transmission through one material, e.g. oil, and another material, e.g. gas. Little or no calibration is required in such applications.

When the apparatus is inserted in a vessel containing a multi-phase fluid which is stratified according to the density of each phase, the time of flight of sound between the transmitter and receiver of adjacent transmitter-receiver pairs, and/ or the attenuation of the sound measured as a loss of signal at the receiver, may be compared in order to identify a stepchange between the time of flight recorded between a first pair of transducers and that between an adjacent second pair of transducers, which would indicate that a phase change occurs between or in the region of the first and second transmitter-receiver pairs. The comparison is preferably made between an average of the time of flight and/or amplitude measurements recorded at each transducer-receiver pair, the average being taken over an appropriate period of time. The time over which the average is measured depends upon the rate of change of the levels expected in the vessel and the time-precision required of the apparatus, and may vary within wide limits, for example from less than a second to several minutes. By using average measurements or applying other, known, data smoothing methods, the error in the location of the interphase region caused by data spikes or noise may be reduced. It is a particular benefit of the apparatus and method of the invention that, by comparing the amplitude of the received signal and TOF measured by adjacent transducers in a housing, the effects of temperature and pressure, which change the acoustic properties of the fluid medium, may be ignored. In this form of the apparatus and method, the actual speed of sound and density of the medium is not required to be calculated because the change in acoustic properties between the positions of adjacent transducers is used to identify the presence of a material interface. The nature of the materials forming the interface can be deduced from the position of the interface and the knowledge of the contents of the vessel.

Therefore in a preferred form of the invention, the method includes the steps of comparing the time of flight of sound $TOF_1$ measured by a first transmitter-receiver pair $TR_1$ with the time of flight of sound $TOF_2$ measured by a second transmitter-receiver pair $TR_2$ and calculating whether $TOF_1$ differs from $TOF_2$ by more than a predetermined value. $TR_1$ and $TR_2$ may be adjacent but need not be when it is required to determine whether an interface between two materials in the vessel lies between two non-adjacent transmitter-receiver pairs. Instead of the TOF measured by the TR pairs, the amplitude of the signal received by the respective receivers $R_1$ and $R_2$ may be compared. This is useful when the speed of sound is similar in different phases within the vessel. It is preferred to compare the time of flight and/or amplitude recorded by the $TR_1$ with a predetermined value based on the time of flight and/or amplitude recorded by $TR_2$, the predetermined value being an upper and/or lower limit within which the value of time of flight or amplitude may be expected to vary within the same material phase. For example, it may be determined that a phase change occurs between the locations of adjacent transmitter-receiver pairs when the time of flight measured by each pair varies by more than a certain selected percentage P e.g. from 0.5-5%, i.e. when:

$$TOF_1 < TOF_2 - ((P/100)*TOF_2) \text{ or}$$

$$TOF_1 > TOF_2 + ((P/100)*TOF_2)$$

$TOF_1$ and $TOF_2$ being, in this case, the time of flight measured at adjacent transmitter-receiver pairs 1 and 2.

In a particularly preferred form of the method of the invention, said first ultrasound transducers comprise a linear array of ultrasound transmitters $T_1$-$T_x$, where x is the number of transmitters in the array, said second ultrasound transducers comprise a linear array of ultrasound receivers $R_1$-$R_x$, said transmitters and receivers forming a plurality of transmitter-receiver pairs $TR_n$, where n is an integer from 1 to x and both first and second housings are placed in a vessel aligned with and parallel to each other, oriented such that the housings extend towards the bottom of the vessel, $T_1$ and $R_1$ being nearest the bottom of the vessel, wherein step (f) comprises the steps of:
  i. preferably starting with n=1, measuring the amplitude of the signal $A_n$ received by the receiving transducer $R_n$;
  ii. comparing $A_n$ with a predetermined amplitude $A_L$;
  iii. if $A_n > A_L$ then measuring $TOF_n$ where $TOF_n$ is the time of flight of the sound between $T_n$ and $R_n$;
  iv. if $A_n < A_L$ then recording $TR_n$ as located within a material phase having high sound attenuation properties, e.g. a solids-containing phase, a gas phase or a discontinuous phase such as a foam or an emulsion;
  v. repeating steps i-iv for each $TR_n$ until n=x;
  vi. comparing $TOF_n$ with $TOF_{n+i}$;
  vii. if $TOF_{n+1} > TOF_n + P$ % then recording that a material phase boundary lies between $TR_n$ and $TR_{n+1}$ where P is a predetermined value representing a significance factor.

$A_L$ is preferably at least 10%, more preferably at least 20%, optionally a value up to about 50% of the amplitude of the signal which would be received if the material between the first and second housings is a homogeneous liquid phase. $A_L$ may be calculated from the parameters of the transmitted ultrasound and the properties of the apparatus or it may be obtained by a calibration. P is usually between about 0.1 and about 5% and is used to calculate whether the change in TOF between adjacent transducers is significant or merely due to statistical noise. P may be selected based on calibration trials to determine the noise inherent in the measurement system or it may be a calculated value. $A_n$ and $TOF_n$ are preferably time-averaged as described above. The method preferably also includes compiling a phase profile of the material within the vessel from the location of each $TR_n$ and the $TOF_n$ and $A_n$ measurements.

In order to further verify the location of an interface, the preferred method may include the additional steps of:
  viii. comparing $TOF_n$ with $TOF_{n+2}$ and optionally $TOF_{n+3}$;
  ix. if each of $TOF_{n+1}$, $TOF_{n+2}$ and optionally $TOF_{n+3} > TOF_n + P$ % then recording that a material phase boundary lies between $TR_n$ and $TR_{n+1}$.

This step checks that the transducers above TRn+1 also record a material phase boundary to reduce the risk that spurious variations in $TR_{n+1}$ or $TR_n$ are erroneously interpreted a phase boundary. This step is preferred when the there are more than two or three transducers expected to be located within each material phase, based on the known parameters of the vessel and its contents.

Normally, the number of phases present in the vessel and their approximate composition is known and this information may be used to interpret the information gained from comparing the time of flight and signal from the pairs of transducers. For example, the phases in an oil separator would be expected to include oil, water, gas and probably an oil/water emulsion, a foam and possibly a heavy phase at the bottom of the vessel containing sand or other solids. When the acoustic transmission between a transmitter-receiver pair at the bottom of the vessel is very low or cannot be measured, ($A_n < A_L$) then it may be assumed that that pair is located within the solids-containing phase. As each successive transmitter-receiver pair located further from the vessel bottom is monitored, the acoustic transmission increases quite sharply above the level of the solids and this may be assumed to signify the lowest level of the water. Monitoring the transmitter-receiver pairs above this level, another change in acoustic transmission between adjacent pairs, normally to a longer time of flight, indicates the location of the oil phase. A loss of signal between the oil and water phases, possibly accompanied by an intermediate time of flight (if measurable) would normally indicate the presence of an emulsion phase. The speed of sound through an emulsion normally lies between the speed of sound in each of its component liquids and is proportional to the amount of each liquid in the emulsion. Above the oil phase, a loss of signal (amplitude) and longer TOF may indicate a foam or a gas phase. An additional phase transition above the foam or gas may confirmatory because then the unknown phase is likely to be foam with the additional phase change indicating a transition to gas phase above the foam. If an additional transducer is present to measure the height of the condensed phase then the presence of foam and its height if present may be further confirmed.

The apparatus of the invention may also provide information about the flow of fluids in which at least one of the transducer pairs is located. For example, by comparing time of flight of the ultrasound between one pair of transducers in one direction with time of flight in the other direction, the rate and direction of fluid flow may be estimated.

In another embodiment of the invention, the transducers are capable of emitting/transmitting and receiving a range of different frequencies. By monitoring and comparing the time of flight and attenuation of ultrasonic energy through a medium at different transmission frequencies, i.e. over a spectrum of frequencies, additional information may be gained about the nature of the medium. Such information may be used to calculate characteristics of a discontinuous phase within a continuous phase of a multi-phase medium such as an emulsion or foam, or to provide information about the quantity and size of solid particles such as sand suspended in a liquid medium.

The invention is of particular utility in the oil & gas recovery industry, especially in an oil/water separator. Thus an oil/water separator may be provided with an inlet for an oil/water mixture and separate outlets for separated oil and water phases and provided with a monitoring apparatus in accordance with the invention, the housings containing the ultrasound transducers being disposed substantially vertically in the vessel with an array of transmitters and receivers disposed along, a length of the housings traversing the expected oil/water boundary. Preferably the housings are also provided with an array of transmitters and receivers disposed along a length of each housing traversing the expected gas/liquid boundary. The rates of flow to the inlet and/or from the outlets may be controlled in response to the monitored levels of the oil/water and/or gas/liquid boundaries. Many other applications exist in various industries in which the location of material phase transitions must be identified, e.g. monitoring the settling of solids within a precipitator or treatment process or the separation of an emulsion, for example after a washing process, as described in U.S. Pat. No. 4,565,088.

Figure 1:
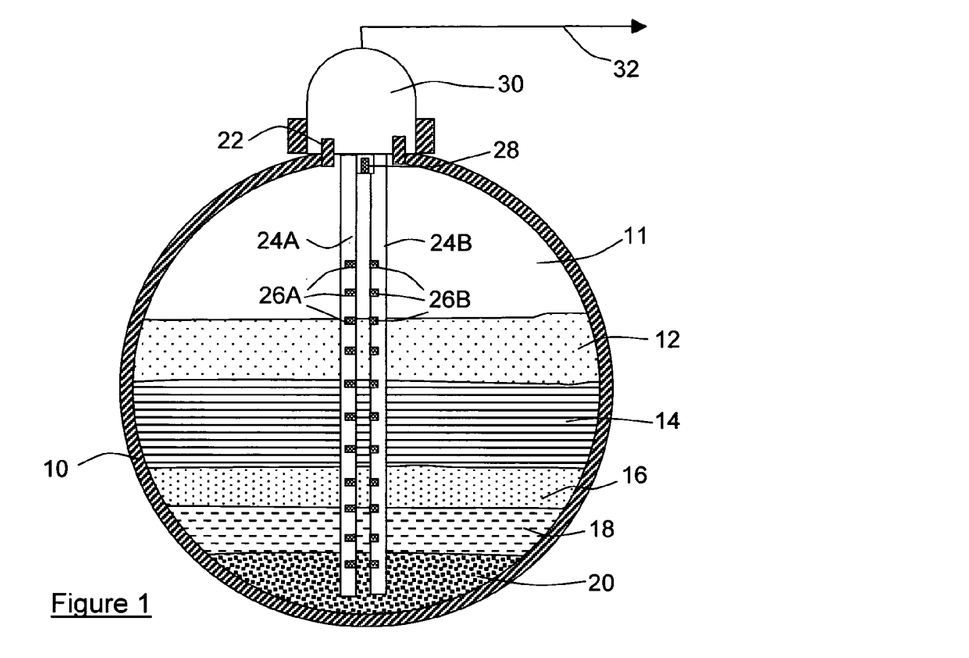
FIG. 1: A schematic drawing of a transverse section through an oil separator vessel into which an apparatus of the invention has been installed.

In FIG. 1, an oil separator vessel 10 contains a multiphase fluid flow from an oil & gas well. The flow comprises a gas phase 11, crude oil 14, and water 18. Additional heterogeneous phases are also present, namely a foam 12 which forms between the oil and gas phases, an emulsion 16 between the oil and water and a dense lower phase 20 incorporating solid particles of sand and other heavy materials. The fluids enter the vessel through an inlet port (not shown), separate into phases, by gravity, and are then extracted from the vessel separately through separate outlet ports (not shown). Chemicals may be added to the fluids in order to break the foam and emulsion phases so that they separate into the desired gas, oil and water phases. The apparatus of the invention comprises titanium dip tubes 24A,B each containing a plurality of ultrasound transducers 26A,B supported in a linear arrangement along the length of the dip tubes. Each transducer 26A is arranged to transmit and receive ultrasonic waves to and from a respective one of the transducers 26B to form a transmitter/receiver pair. The transducers of a pair are located at the same distance along their respective dip tube and oriented to receive ultrasonic waves preferentially from the other one of the pair. The dip tubes are supported by a housing 30 and are sized to fit into the vessel through an inspection port 22. A separate housing contains an additional ultrasound transducer 28, oriented to transmit towards the surface of the foam 12. Electrical connections (not shown) run along the dip tubes and to the housing 30 to carry power and signals to the transducers and signals from the transducers to a data processing unit within the housing. Housing 30 additionally contains a pulse modulator, signal/data processor and a power source, suitable for powering the transducers, pulse generator and data processor. Optical fibre 32 connects the apparatus to a control system and carries data from the data processor to a monitoring station. The apparatus is positioned in the vessel so that the dip tubes penetrate through the different fluid phases 11-20.

Figure 3:
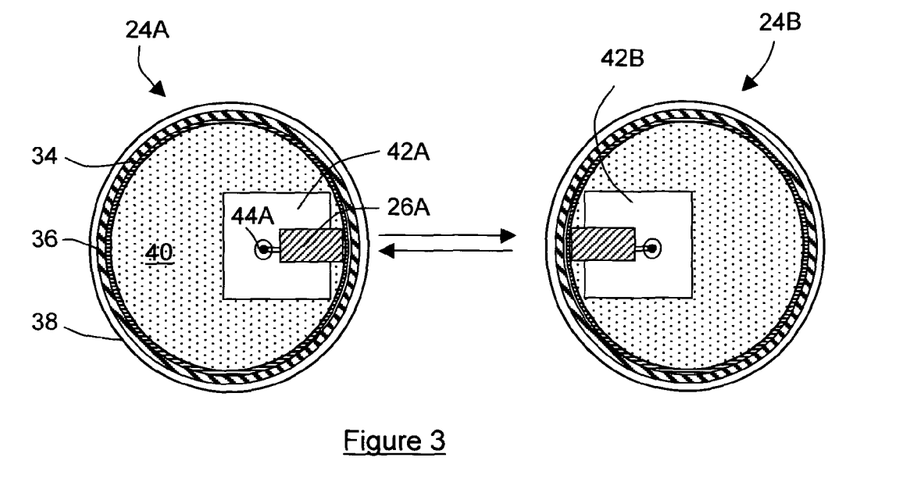
FIG. 3: A transverse cross-section through one embodiment of an apparatus according to the invention.

FIG. 3 shows a cross section through the dip tubes 24A,B. Each dip tube is formed of a titanium alloy wall 36 having an inner coating 34 and an outer coating 38. The coating 34 is selected to acoustically couple the dip tube inner surface to the coupling fluid 40. Coating 38 is selected to acoustically couple the outer surface of the dip tube to the medium in which it is to be immersed. The ultrasound transducers 26 are mounted in a supporting block 42 provided with electrical connections 44 for carrying electrical power and signals to and from the transducers.

Figure 2:
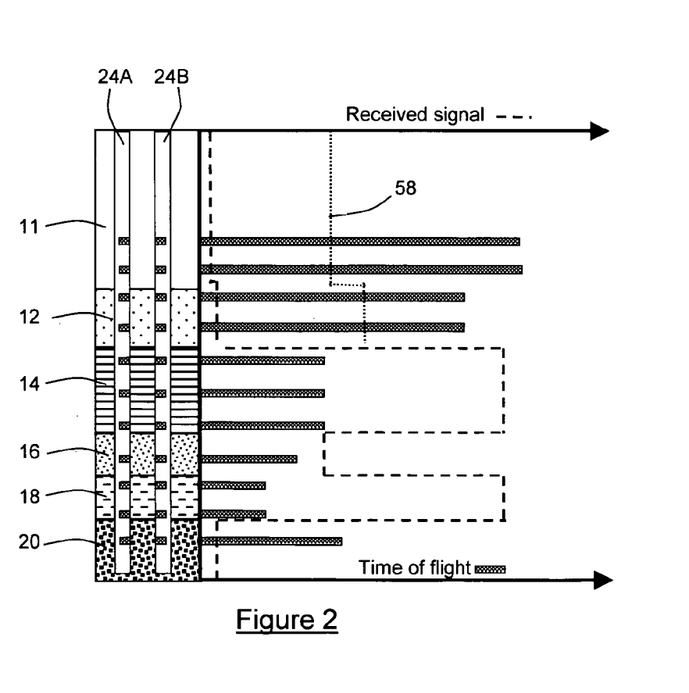
FIG. 2: A representation of the received signal characteristics in each phase of a multi-phase system.

In operation, the pulse generator generates and transmits an electrical signal to one member A of one or more transducer pairs A-B. Transducer A responds by transmitting an ultrasound pulse to the other of its pair, transducer B. On receipt of the ultrasonic pulse, transducer B generates an electrical signal in response. The signal is sent to the signal/data processor and simultaneously stimulates transducer B to transmit a second ultrasonic pulse to transducer A, which also generates an electrical signal on receipt of the pulse. The signal /data processor calculates the time taken for each signal to pass from the transmitter to the receiver (time of flight), which is directly related to the density of the medium through which the wave has traveled, and the amplitude of the ultrasonic wave received, from which attenuation due to interfacial loss may be calculated. FIG. 2 shows how the time of flight (horizontal bars) and amplitude (dashed line) varies between pairs of transducers located in the phases 11-20 described in FIG. 1.

The speed of sound in the gas phase is much less than in a condensed phase and so the time of flight is relatively long. When the time of flight is similar in different phases, e.g. between oil 14, emulsion 16 and water 18, the phases may be more readily distinguishable by comparing the attenuation of the sound as it passes through the phases. The dashed line represents the received signal strength (amplitude) in different phases. The discontinuous emulsion and foam phases bring about more attenuation as the sonic energy is dissipated at the boundaries between the included and continuous phase so that the received signal strength is relatively low compared with transmission through a continuous phase. The heavy sand phase 20 is highly attenuating so that very little if any signal would be expected to transmit through, depending on the amount of sand particles present. When there is a significant difference in time of flight and/or attenuation of signal between longitudinally adjacent pairs of transducers, a phase-change in the surrounding fluid may be inferred. Alternatively the data processor may, by calibration, calculate actual and relative densities of one or more of the phases in the system. The signal received by transducer 28 as a reflection from the surface of the foam 12, establishes the distance between the transducer 28 and the surface of the foam when the density of the gas phase, through which the ultrasound travels, is known. In this way the location of the foam surface may be confirmed.

Figure 4:
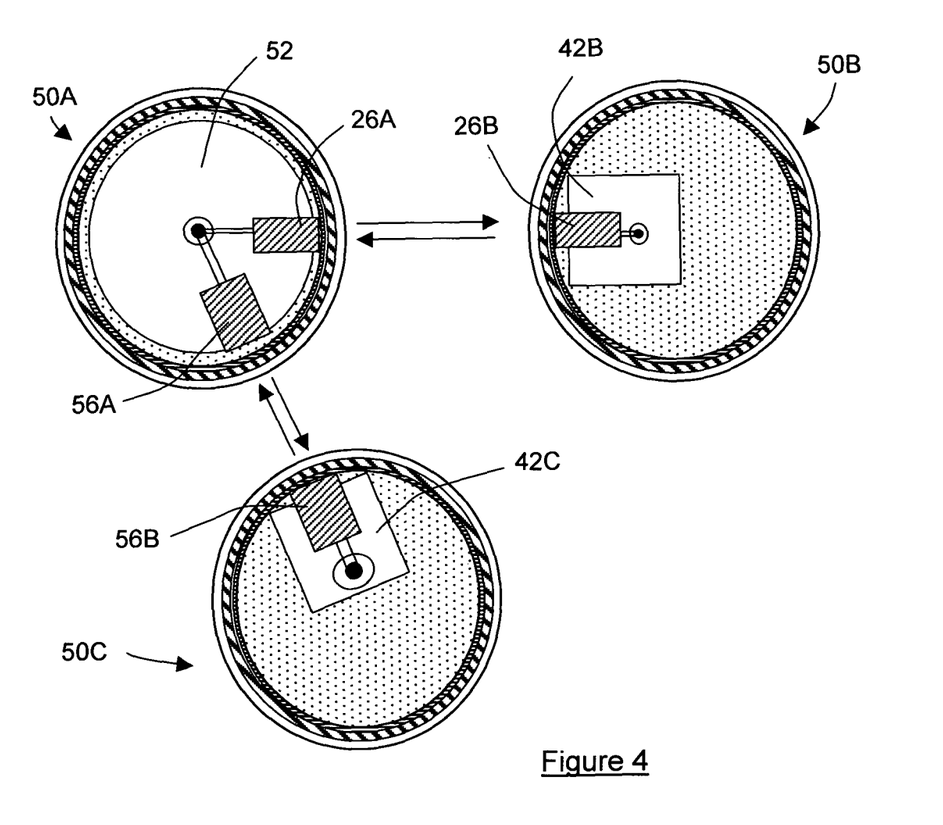
FIG. 4: A transverse cross-section through an alternative apparatus according to the invention.
Figure 5A:
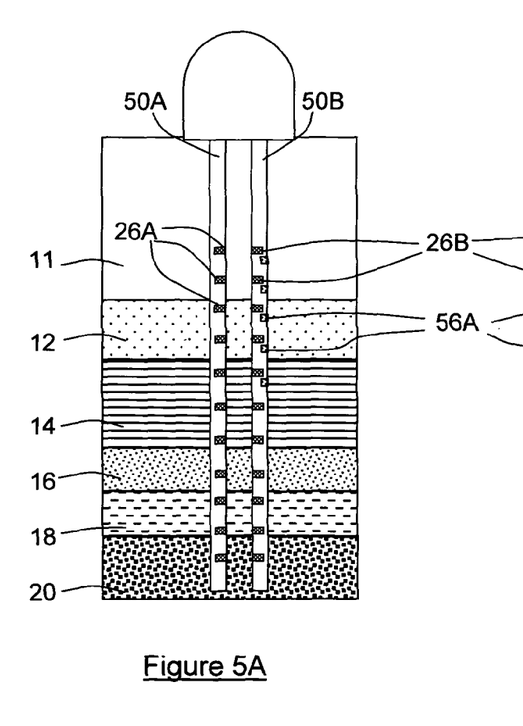
FIG. 5A: A first longitudinal cross-section through an apparatus of the invention.
Figure 5B:
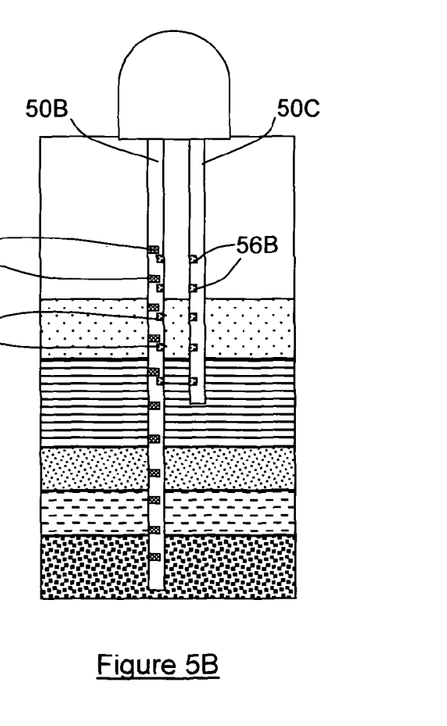
FIG. 5B: A second longitudinal cross-section view through the apparatus in FIG. 5A shown at 90° to 5A.

FIG. 4 shows an alternative embodiment wherein three dip tubes 50 are present. Dip tube 50A contains a support 52 supporting two vertical arrays of piezoelectric sensors 26A and 56A oriented to transmit sonic waves in different directions. The transducer 26A transmits to and receives from transducer 26B located in dip pipe 50B. Dip tube 50C contains a support 42C housing an array of transducers 56B. Transducers 26 A & B are selected to transmit and receive ultrasonic energy at about 2-3 MHz. The transducer 56A transmits to and receives from transducer 56B located in dip pipe 50C. Transducers 56 A & B are selected to transmit and receive lower frequency sound at between 1-20 kHz. This embodiment is useful in detecting the level of gaseous and foam media which are highly attenuating to ultrasonic energy. FIG. 5 shows the apparatus arranged in a multiphase medium 11-20 as described previously. FIG. 5A is a view drawn at 90° to the view in FIG. 5B. Dip pipe 50C, containing the array of low-frequency transducers is shorter than dip pipes 50 A and 50 B because the low frequency transducers are not required in the part of the vessel containing liquid media. In alternative arrangements different transducer arrays may be provided over the full depth of the fluid medium or only partial depth as shown here. The dotted line 58 in FIG. 2 represents the received signal strength measured by the lower frequency transducers 56 A & B.

The invention claimed is:

1. A method of determining the location of an interface between two materials within a vessel comprising:
   (a) providing a plurality of first ultrasound transducers capable of transmitting ultrasound through at least one of said two materials, said first ultrasound transducers being located within a first elongate housing, spaced apart from one another along a longitudinal axis of the first housing;
   (b) providing a plurality of second ultrasound transducers capable of receiving ultrasound transmitted by said first ultrasound transducers and generating an electrical signal in response thereto, said second ultrasound transducers being located within a second elongate housing, spaced apart from one another along a longitudinal axis of the second housing,
   (c) each one of said first ultrasound transducers being associated with a respective one of said second ultrasound transducers to form a transmitter-receiver pair, such that ultrasound emitted by one member of said pair is capable of being received by the other member of said pair to generate an electric signal in said other member of said pair,
   (d) locating the first and second housings within the vessel such that the ultrasound transmitted by at least one of the first transducers is capable of being detected by at least one respective second transducer and that the first and second housings containing the transducers are at least partially immersed in at least one of the materials contained in the vessel,
   (e) transmitting ultrasound from more than one of said first ultrasound transducers to respective second ultrasound transducers and monitoring the signal generated by each of said second ultrasound transducers in response to the ultrasound transmitted by said first ultrasound transducers,
   (f) comparing the signal generated by the receiving second ultrasound transducer or a parameter calculated from said signal with the signal generated by a different receiving ultrasound transducer or a parameter calculated from said signal to determine whether the acoustic characteristics of the material located between the first housing and the second housing changes between the compared receiving transducers,
   wherein said first ultrasound transducers comprise a linear array of ultrasound transmitters $T_1$ to $T_x$, where x is the number of transmitters in the array, said second ultrasound transducers comprise a linear array of ultrasound receivers $R_1$ to $R_x$, said transmitters and receivers forming a plurality of transmitter-receiver pairs $TR_n$, where n is an integer from 1 to x and both first and second housings are placed in a vessel aligned with and parallel to each other, oriented such that the housings extend towards the bottom of the vessel, $T_1$ and $R_1$ being nearest the bottom of the vessel, and wherein step (f) comprises:
   i. measuring the amplitude of the signal $A_n$ received by the receiving transducer $R_n$;
   ii. comparing $A_n$ with a predetermined amplitude $A_L$;
   iii. if $A_n > A_L$ then measuring $TOF_n$ where $TOF_n$ is the time of flight of the sound between $T_n$ and $R_n$;
   iv. if $A_n < A_L$ then recording $TR_n$ as located within a material phase having high sound attenuation properties;
   v. repeating steps i-iv for each $TR_n$ until n=x;
   vi. comparing $TOF_n$ with $TOF_{n+1}$;
   vii. if $TOF_{n+1} > TOF_n + P$ % then recording that a material phase boundary lies between $TR_n$ and $TR_{n+1}$ where P is a predetermined value representing a significance factor.

2. A method according to claim 1, wherein one of said first transducers transmits a pulse of ultrasound towards one of said second transducers associated with the one of said first transducers, which, upon receipt of the pulse, is stimulated to transmit back to the initiating one of said first transducers.

3. A method according to claim 2, wherein a pulse generator provides to each transmitting transducer a coded sequence of pulses and further wherein the pulse coding of adjacent transmitting transducers is different.

4. A method according to claim 1, wherein adjacent transmitting transducers are stimulated to transmit at different times.

5. A method according to claim 1, wherein the time of flight of the ultrasonic energy between a first transmitter-receiver pair is compared with the time of flight of ultrasonic energy between an adjacent transmitter-receiver pair.

6. A method according to claim 1, wherein the attenuation of the ultrasonic energy between a first transmitter-receiver pair is compared with the attenuation of ultrasonic energy between an adjacent transmitter-receiver pair.

7. A method according to claim 1, wherein steps i-iv are carried out for each $TR_n$ in sequence starting from $TR_1$.

8. A method according to claim 1, further comprising:
viii. comparing $TOF_n$ with $TOF_{n+2}$, and
ix. if each of $TOF_{n+1}$ and $TOF_{n+2} > TOF_n + P\%$ then recording that a material phase boundary lies between $TR_n$ and $TR_{n+1}$.

9. A method according to claim 8, further comprising comparing $TOF_n$ with $TOF_{n+3}$ in step viii., wherein
said recording that said material phase boundary lies between $TR_n$ and $TR_{n+1}$ in step ix occurs if each of $TOF_{n+1}$, $TOF_{n+2}$ and $TOF_{n+3} > TOF_n + P\%$.

10. A method according to claim 1, wherein $A_n$ and $TOF_n$ are calculated as average values of A and TOF values measured at intervals over a period of time.

11. A method according to claim 1, further comprising compiling a phase profile of the material within the vessel from the location of each $TR_n$ and the $TOF_n$ and $A_n$ measurements.

12. A method according to claim 1, wherein the first elongate housing and the second elongate housing each have an internal wall and an external wall and at least one of the plurality of first or second transducers generates a signal in response to the detection of the emissions of the at least one transducer reflected back from the internal wall of the respective housing and wherein said signal is processed to provide information about an acoustic coupling between the external wall of the housing and at least one of the materials external and immediately adjacent to it.

13. A method according to claim 1, wherein the time of flight of the ultrasonic energy between the members of a transmitter-receiver pair in one direction is compared with time of flight in the other direction such that the rate and direction of fluid flow may be estimated.

14. A method according to claim 1, wherein at least one of the materials in the vessel is a fluid and at least one of said first or second transducers is periodically stimulated to emit sound waves of a frequency suitable to induce cavitation of the fluid.

15. A method according to claim 1, wherein the time of flight of the ultrasonic energy between a first transmitter-receiver pair is compared with the time of flight of ultrasonic energy between an adjacent transmitter-receiver pair and further wherein the attenuation of the ultrasonic energy between a first transmitter-receiver pair is compared with the attenuation of ultrasonic energy between an adjacent transmitter-receiver pair.

16. A method according to claim 1, wherein in step (e), pulses of ultrasound are transmitted from said more than one of said first ultrasound transducers to said respective second ultrasound transducers.

17. An apparatus comprising:
(a) a plurality of first ultrasound transducers capable of transmitting ultrasound through at least one of said materials, said first transducers being located within a first elongate housing, arranged as a linear array of ultrasound transmitters $T_1$ to $T_x$, where x is the number of transmitters in the array, spaced apart from one another along a longitudinal axis of the first housing;
(b) a plurality of second ultrasound transducers capable of receiving ultrasound transmitted by said first ultrasound transducers and generating an electrical signal in response thereto, said second transducers being located within a second elongate housing, arranged as a linear array of ultrasound receivers $R_1$ to $R_x$, spaced apart from one another along a longitudinal axis of the second housing,
(c) each one of said first ultrasound transducers being associated with a respective one of said second ultrasound transducers to form a plurality of transmitter-receiver pairs $TR_n$, where n is an integer from 1 to x, such that ultrasound emitted by one member of said pair is capable of being received by the other member of said pair to generate an electric signal in said other member of said pair,
(d) mounting means for said first and second housings, said mounting means being capable of maintaining said first and second housings in a position relative to each other such that each one of a transmitter-receiver pair is aligned with the other one of the transmitter - receiver pair and that ultrasound transmitted by at least one of the first transducers is capable of being detected by at least one respective second transducer,
(e) mounting means for mounting the first and second housings aligned with and parallel to each other within a vessel such that the first and second housings extend towards the bottom of the vessel, $T_1$ and $R_1$ being nearest the bottom of the vessel and at least a part of the first and second housings containing the transducers may be immersed in at least one of the materials contained in the vessel, and
(f) signal processing means capable of comparing signals generated by the second ultrasound transducers or a parameter calculated from said signals to identify a material interface by determining whether the acoustic characteristics of any material located between the first housing and the second housing changes between any of the transmitter-receiver pairs, wherein the comparing of signals comprises:
i. measuring the amplitude of the signal $A_n$ received by the receiving transducer $R_n$,
ii. comparing $A_n$ with a predetermined amplitude $A_1$,
iii. if $A_n > A_1$, then measuring $TOF_n$ where $TOF_n$ is the time of flight of the sound between $T_n$ and $R_n$,
iv. if $A_n < A_1$ then recording $TR_n$ as located within a material phase having high sound attenuation properties,
v. repeating steps i-iv for each $TR_n$ until n=x,
vi. comparing $TOF_n$ with $TOF_{n+1}$,
vii. if $TOF_{n+1} > TOF_n + P\%$ then recording that a material phase boundary lies between $TR_n$ and $TR_{n+1}$ where P is a predetermined value representing a significance factor.

18. An apparatus according to claim 17, wherein the first and second housings are formed from a titanium-containing metal alloy.

19. An apparatus according to claim 17, wherein the first and second housings contain an acoustic coupling medium.

20. An apparatus according to claim 17, wherein at least one of an internal and external wall of the first and second housings is coated with an acoustically coupling coating.

21. An apparatus according to claim 17, further comprising a plurality of third transducers capable of transmitting sonic energy through at least one of said materials and a plurality of fourth transducers capable of receiving sonic energy transmitted by said third ultrasound transducers and generating an electrical signal in response thereto each one of said third transducers being associated with a respective one of said fourth transducers to form a second transmitter-receiver pair, such that ultrasound emitted by one member of said second pair is capable of being received by the other member of said second pair to generate an electric signal in said other member of said second pair.

22. An apparatus according to claim 21, wherein said plurality of third and fourth transducers are adapted to transmit and receive sonic energy of a different frequency from said first and second transducers.

23. An apparatus according to claim 17, further comprising:
 (g) a power source, and
 (h) a pulse generator to drive the first transducers to emit pulses of ultrasound of the required frequency.

\* \* \* \* \*